US011995922B2

(12) United States Patent
Brace et al.

(10) Patent No.: US 11,995,922 B2
(45) Date of Patent: May 28, 2024

(54) FLIGHT MANAGEMENT SYSTEM AND METHOD FOR REPORTING AN INTERMITTED ERROR

(71) Applicant: GE AVIATION SYSTEMS LLC, Grand Rapids, MI (US)

(72) Inventors: Terrell Michael Brace, Ada, MI (US); Troy Stephen Brown, Kalamazoo, MI (US); Franco Elías Ledesma Orozco, Querétaro (MX); Francisco Javier Sanchez del Valle, Querétaro (MX)

(73) Assignee: GE Aviation Systems LLC, Grand Rapids, MI (US)

( * ) Notice: Subject to any disclaimer, the term of this patent is extended or adjusted under 35 U.S.C. 154(b) by 214 days.

(21) Appl. No.: 16/943,619

(22) Filed: Jul. 30, 2020

(65) Prior Publication Data
US 2022/0036669 A1 Feb. 3, 2022

(51) Int. Cl.
*G06F 11/00* (2006.01)
*B64D 45/00* (2006.01)
*G06F 11/07* (2006.01)
*G07C 5/08* (2006.01)
*G08G 5/00* (2006.01)

(52) U.S. Cl.
CPC ........... *G07C 5/0816* (2013.01); *B64D 45/00* (2013.01); *G06F 11/0775* (2013.01); *G06F 11/0787* (2013.01); *G07C 5/085* (2013.01); *G08G 5/0021* (2013.01)

(58) Field of Classification Search
CPC .................. G06F 11/0787; G06F 11/0739
See application file for complete search history.

(56) References Cited

U.S. PATENT DOCUMENTS

| 5,408,651 | A | 4/1995 | Flocken et al. | |
|---|---|---|---|---|
| 5,790,779 | A * | 8/1998 | Ben-Natan | G06F 11/0775 714/39 |
| 6,122,740 | A * | 9/2000 | Andersen | H04L 63/1425 726/4 |
| 6,278,913 | B1 * | 8/2001 | Jiang | G07C 5/0858 701/25 |
| 6,519,730 | B1 | 2/2003 | Ando et al. | |
| 6,757,690 | B2 * | 6/2004 | Aldrich | G06F 21/6227 707/999.102 |
| 8,060,470 | B2 * | 11/2011 | Davidson | G06F 16/26 707/648 |
| 9,396,085 | B2 * | 7/2016 | Hoffmeister | G06F 11/3072 |
| 9,589,074 | B2 | 3/2017 | Bhattacharjee et al. | |
| 9,710,313 | B2 | 7/2017 | Decker et al. | |
| 9,753,809 | B2 | 9/2017 | Antony | |
| 9,794,340 | B2 | 10/2017 | Sykes et al. | |
| 10,037,166 | B2 | 7/2018 | Decker et al. | |
| 10,146,473 | B2 | 12/2018 | Decker et al. | |
| 10,216,562 | B2 | 2/2019 | Miller et al. | |
| 10,409,672 | B2 | 9/2019 | Pignatelli et al. | |
| 10,417,261 | B2 | 9/2019 | Hochwarth et al. | |

(Continued)

*Primary Examiner* — Amine Riad
(74) *Attorney, Agent, or Firm* — McGarry Bair PC

(57) ABSTRACT

A system and a method for identifying errors within a modular framework of a system comprising of a flight management system and an error reporting system. The modular components and correlating code modulars of the modular framework can be executed collectively or independently. Each modular component can be designed to incorporate independent modular updates or modifications.

20 Claims, 4 Drawing Sheets

(56) References Cited

U.S. PATENT DOCUMENTS

| | | | |
|---|---|---|---|
| 10,489,461 B2 | 11/2019 | Bhattacharjee et al. | |
| 2009/0013007 A1* | 1/2009 | Caner | H04L 43/04 |
| 2012/0204068 A1* | 8/2012 | Ye | G06F 11/0769 |
| | | | 714/57 |
| 2014/0018976 A1* | 1/2014 | Goossen | G07C 5/008 |
| | | | 701/2 |
| 2015/0205654 A1* | 7/2015 | Gregg | G06F 11/0751 |
| | | | 714/37 |
| 2016/0052640 A1* | 2/2016 | Buehler | G07C 5/0808 |
| | | | 340/945 |
| 2016/0080517 A1 | 3/2016 | Decker et al. | |
| 2018/0285184 A1* | 10/2018 | Hotta | G06F 11/3495 |
| 2019/0227899 A1* | 7/2019 | Abdul | G06F 11/3664 |

\* cited by examiner

FLIGHT MANAGEMENT SYSTEM AND METHOD FOR REPORTING AN INTERMITTED ERROR

TECHNICAL FIELD

The present subject matter relates generally to technologies used in embedded systems such as a flight management system for an aircraft.

BACKGROUND

A flight management system (FMS) is a fundamental component of a modern airliner's avionics. An FMS is a specialized computer system that automates a wide variety of in-flight tasks, reducing the workload on the flight crew to the point that modern civilian aircraft no longer carry flight engineers or navigators. Just as any computing system, an FMS is subject to system errors. Error reporting systems collect information, data, and the like, about these errors are utilized for error corrections to these computing systems.

BRIEF DESCRIPTION

One example aspect of the present disclosure relates to a system for an error reporting system, comprising, a system having memory defining a set of data elements storing a respective set of data element values, and a set of functional elements, an access log defining a list of functional elements that access at least a subset of the set of data elements, an error reporter having view access to the set of data elements of the system, and in response to receiving a trigger event that one of the set of functional elements access at least the subset of the data elements, logging an access entry in the access log, including at least the one of the set of functional elements access at least the subset of the data elements and the subset of the data elements accessed by the one of the set of functional elements, and a fault handler configured to identify an error of the system, including identifying at least one of the set of functional elements causing the identified error, defining an error functional element, the fault handler in communication with the error reporter, wherein, in response to identifying the error of the system, the fault handler is further configured to provide the error functional element to the error reporter, and wherein the error reporter is configured to identify a plurality of access entries in the access log based on the error functional element, retrieve a present subset of the set of data element values of the subset of data elements accessed by the error functional element, and to export an error report defining at least the error functional element, the identified access entries, and the present subset of data element values.

Another example aspect of the present disclosure relates to a method for reporting an intermittent error within a system, the method comprising, logging in an access log, a list of functional elements that access at least one of a set of data elements stored in memory of the system, performing system functions during runtime, by a functional element, wherein the performed system functions include accessing at least one of the set of data elements, identifying an error of the system, the error caused by the functional element, and in response to identifying the error, retrieving, by the error reporter, from the access log, a list of the set of data elements accessed by the functional element, retrieving, by the error reporter, a present set of data element values of the list of set of data elements, exporting, by the error reporter, an error report defining at least one of the error, the functional element, the list of the set of data elements, and the present set of data element values.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure of the present description, including the best mode thereof, directed to one of ordinary skill in the art, is set forth in the specification, which makes reference to the appended FIGS., in which.

DETAILED DESCRIPTION

Figure 1:
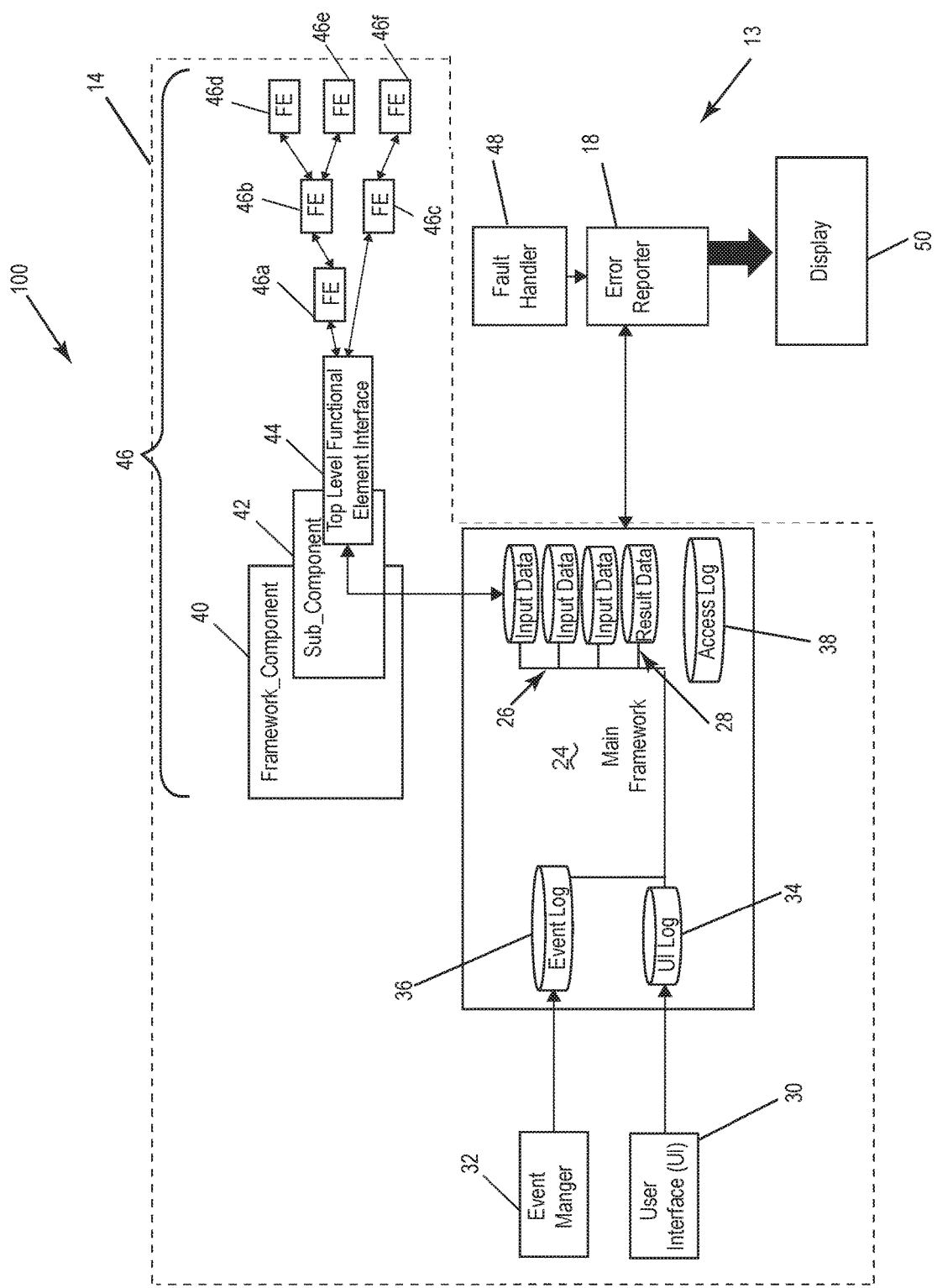
FIG. 1 illustrates a schematic representation of an FMS connected with an error reporting system, in accordance with various aspects described herein.

An FMS can have a common framework that componentizes all functions into reusable components. These components are designed for easy update and adaptation. However, the framework can also experience software errors, such as during design, testing, or in-situ runtime operation, resulting in system errors, framework crashes of the software, or the like. Some reasons for framework crashes can be but not limited to read/write operations over an invalid memory region, invalid arguments to function calls, buffer overflow, or the like. Reproducibility of such errors can also be difficult to achieve due to costs and frequency of the errors. Errors can be classified as: always, intermittent, or only once, depending on the error's frequency of occurrence. "Always" errors are reliably reproducible, "intermittent" errors may be recreateable under proper circumstances (which may or may not be known), and "only once" errors are error types that seem to be not reproducible under many circumstances. Correcting theses errors generally increase in difficulty from "always" to "intermittent" to "only once." Thus, being able to reliably reproduce each and every error (e.g. each error becomes an "always" reproducible error) can reduce the difficulty in addressing the various errors, as needed.

Additionally, if an error is diagnosed earlier in development or in a design phase, then a solution to correct the error can also be found earlier saving money and time, which can keep costs and invested time low, especially as intermittent or only once errors occur. Therefore, the disclosure solves the need of creating a system that can identify an error within a modular component as the error occurs, capture the identifying features of the system at the time the error occurred as the error occurs, and output the captured data to a destination where the data can be reviewed, duplicated, and analyzed.

As used herein, the term "set" or a "set" of elements can be any number of elements, including only one. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Additionally, as used herein, "electrical connection" or "electrically coupled" can include a wired or wireless connection. The exemplary drawings are for purposes of illustration only and the dimensions, positions, order and relative sizes reflected in the drawings attached hereto can vary.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein.

Reference now will be made in detail to aspects of the present disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one aspect can be used with another aspect to yield a still further embodiment. Thus, it is intended that the present disclosure covers such modifications and variations as come within the scope of the appended claims and their equivalents.

As used herein, the term "about," when used in reference to a numerical value is intended to refer to within 30% of the numerical value. As used in the specification and the appended claims, the singular forms "a," "an," and "the" include plural referents unless the context clearly dictates otherwise.

Error reporter systems can be architecturally structured to include FMS functionality as modular components and correlating code modulars. The modular components and correlating code modulars can be executed collectively or independently. As a result of modular components, each modular component can be designed to incorporate independent modular updates or modifications. The independent modular updates or modifications can be implemented without impacting other modular components saving time and money.

FIG. 1 illustrates a schematic representation of a system 100, such as an FMS 14, connected with an error reporting system 13. The system 100 can also define a set of data elements and store a respective set of data element values. The set of data elements, or data values stored in the respective set or subset of data elements can be static, temporal, or combination thereof. In one non-limiting example, the set of data elements, or data values stored in the respective set or subset of data elements can have an associated temporally-limited availability, such that the data values can be "consumed" or otherwise utilized by other system 100 components. The system 100 or FMS 14 can include a main framework 24 for processing operations defining memory utilized to store data or values, as utilized. The main framework 24 can include but is not limited to the set of data elements comprising of a set of input data elements 26, stored in memory, and at least one result data element 28, stored in memory. The main framework 24 can further be in communicative connection with a user interface 30 and an event manager 32. The user interface (UI) 30 can be configured to receive a user input by way of receiving a set of user commands, which the system 100, FMS 14, or main framework 24 can further respond to. In addition to receiving the user interface inputs, the system 100 or FMS 14 can further include a UI log 34 configured or adapted to record or log the set of user interface inputs, interactions, or the like, and store the records or logs to memory for later retrieval. The event manager 32 can include any further external instructions (e.g. "events") provided to the system 100 or FMS 14, for example, from another device, another input, an external system, or the like. The system 100, FMS 14, or main framework 24 can also include an event log 36 configured or adapted to record or log the set of events, or the like, and store the records or logs to memory for later retrieval.

The main framework 24 can also include an access log 38 stored in the memory of the system 100. The access log 38 can define a list of functional elements 46 that access at least a subset of the set of data elements within the system 100. As used herein, "the set of data elements" or "set of data topics" can include, but are not limited to, the set of input data elements 26, the at least one result data element 28, the UI records or logs of events stored in the UI log 34, the event records or logs stored in the event log 36, or a combination thereof. The access log 38 can also store data or references associated with the set of data elements. For example, the access log 38 can further associate a particular component or entity with the set of data elements, or associate information based on the accessing of the subset of the data elements within the system 100. In one non-limiting instance, in the event a functional element 46 accesses a particular subset of data elements, the access log 38 can not only keep record or log of the access, but also which functional element 46 accessed the subset of data elements, the time the access was performed, the then-current data value that was accessed, or the like. Similarly, the access log 38 can keep records or logs of the user input received at the user interface 30 (for example, by way of the UI log 34) or events initiated by the event manager 32 (for example, by way of the event log 36). As used herein, "access" can include defining an access entry that has read or written to the subset of the data elements.

Further elements can interact with the main framework 24, such as framework components 40, sub-components 42, a top-level functional element interface 44, or additional functional elements 46a-f. As used herein, these further elements can include programming routines, subroutines, programming modules, functional partitions, or the like, adapted or configured to perform particular tasks or functional tasks. The functional elements 46 can occur sequentially, simultaneously, or a combination thereof. The functional elements 46 are merely examples of programmatic functions that can, for example, generate errors in the system 100 or FMS 14, as described herein. The particular operations of the functional elements 46 are not germane to aspects of the disclosure.

The error reporting system 13 of the system 100 or FMS 14 can include an error reporter 18, a fault handler 48, a display, or a combination thereof. The error reporter 18 can be communicatively connected with the main framework 24 and memory thereof, for example, the access log 38, the set of data elements, the set of data topics, the set of input data elements 26, the at least one result data element 28, or a combination thereof. The error reporter 18 can "register" with or for the access to the main framework 24, the set of data elements, or the like, in accordance with a predefined access, access registration at system 100 start up, or the like. In one non-limiting example, the error reporter 18 can register with "view" access or "read-only" access of the set of data elements (or a subset thereof), that is, the error reporter 18 can have access to view or read the set or a subset of the data elements, but will not be authorized to update, edit, alter, or otherwise modify the data of the set or the subset of the data elements as the data elements can be static, temporal, or a combination thereof.

The fault handler 48 can include a functional module configured or adapted to identify when a programmatic fault, error, system interrupt, or the like, occurs in the system 100 or the FMS 14. The fault handler 48, in response to determining or identifying that an error is occurring or has occurred, can collect initial information related to the fault, including but not limited to, which functional element 46 produced or caused the fault. The fault handler 48 can be communicatively connected with the error reporter 18, and upon determining or identifying that an error is occurring or has occurred, can communicate the collected initial information related to the fault, to the error reporter 18. As shown, the error reporting system 13 can optionally include an output device, such as an optional display 50. While an optional display 50 is shown, additional output devices can be included. In only non-limiting example, the error reporter 18 can be configured or adapted to generate an error report output and communicate the error report output to the output device, such as the optional display 50. While the error reporting system 13 and the FMS 14 are illustrated separately within the system 100, the error reporting system 13 and the FMS 14 can be incorporated as one system within an FMS 14.

Figure 2:
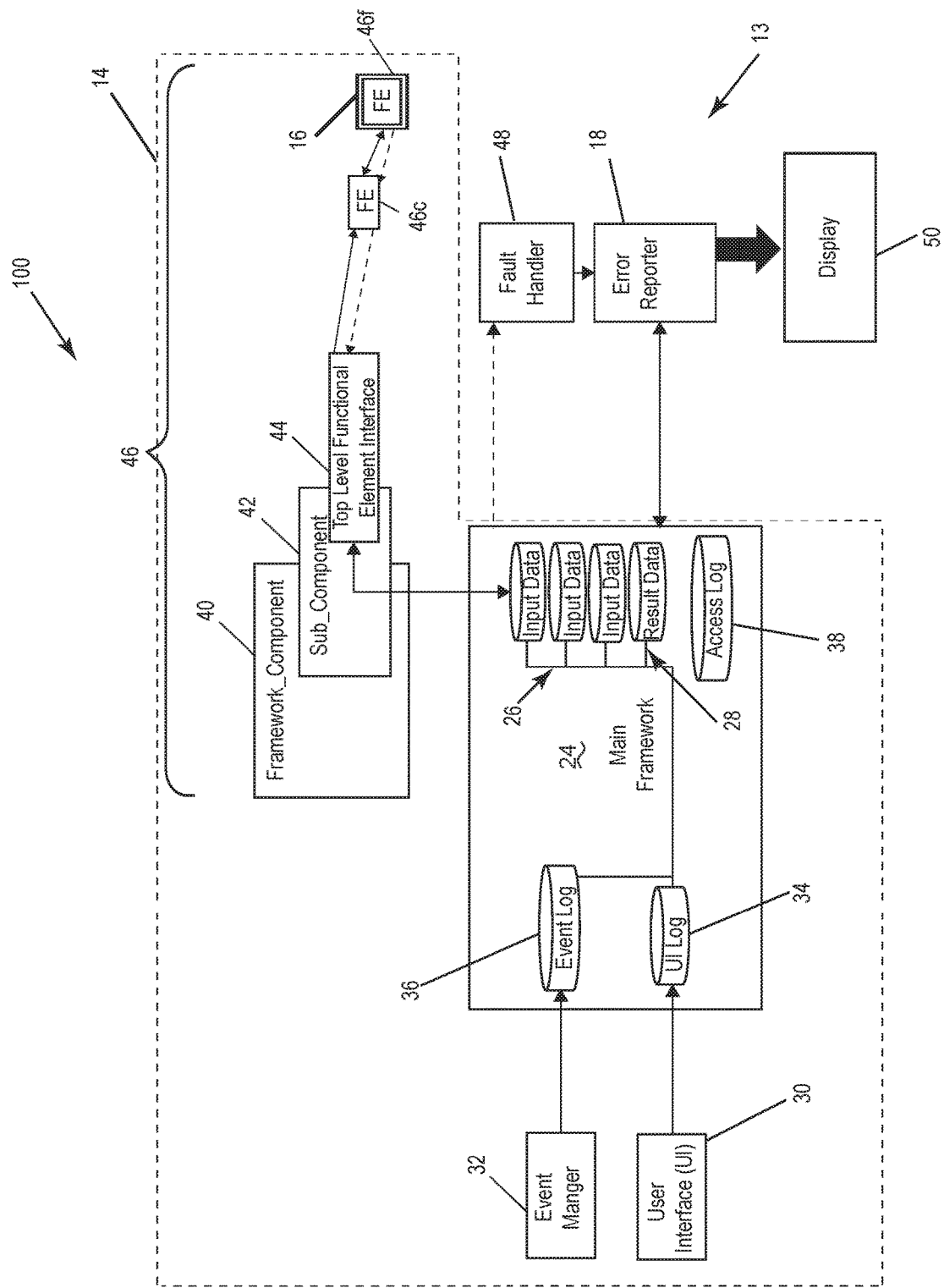
FIG. 2 illustrates a schematic representation of the FMS connected with the error reporting system of FIG. 1, and illustrating an error occurring, in accordance with various aspects described herein.

FIG. 2 illustrates a schematic representation of the system 100 of FIG. 1, highlighting the occurrence of an error 16, for understanding. In response to the system 100 receiving an error 16, the fault handler 48 can be configured to identify an error 16 within one functional element 46 of the system 100 defined as an "error functional element" (e.g. the functional element 46f causing the error, or where the error occurs). The fault handler 48 can include identifying an error functional element 46f or a set of functional elements 46 that caused the error 16. The error functional element 46f and set of functional elements 46 can include the framework component 40, a sub-component 42, a top-level functional element interface 44, or additional functional elements 46a-f. The fault handler 48 can also identify or define the error functional element 46f. The fault handler 48 can also electrically communicate a trigger event to the error reporter 18, along with any other information collected by the fault handler 48, including but not limited to, identifying where the error has occurred (e.g. the identification of the error functional element 46f).

In response to the error reporter 18 receiving the error trigger event, the error reporter 18 can identify a plurality of access entries, including, but not limited to, identifying the set of data elements, the subset of data elements, or the identified set of functional elements 46 based on the error functional element 46f or the set of functional elements 46 that caused the error 16. In a non-limiting example, the error reporter 18 can also identify a set or a subset of the plurality of access entries in the access log 38 based on or associated with access by the error functional element 46f. For example, the error reporter 18 can obtain a list of entries, such as recent entries, of the set or a subset of the data elements that have been accessed (either read or write access) by the error-causing error functional element 46f.

The error reporter 18 can further, in response to identifying the access recorded or logged in the access log 38, retrieve a corresponding data element value or set of data element values of the recent subset of the plurality of access entries. In this example, the error reporter 18 can retrieve not only which subset of data elements the error functional element 46f has accessed, but also the specific data values of that subset of data elements stored in memory of the main framework 24. In one non-limiting example the error reporter 18 can also retrieve a present subset of data element values or a log of access entries.

In one non-limiting example, the error reporter 18 can also compile the identified information into an error report and store the error report in the memory of the system 100. In another non-limiting example, the error reporter 18 can provide the error report to an output device, such as displaying the error report information on the optional display 50, or by export the error report to another output. The error reporter 18 can also be configured to export the error report to a file or to memory for later analysis. The error report can also include at least a portion of the event log 36, if, for example, the error functional element 46f interacted with, or was otherwise affected by an event recorded in the event log 36. The error report can also include a least a portion of the UI log 34, wherein the portion of the UI log 34 relates to the error functional element 46f or the subset of data elements access by the fault handler 48 as an error 16 occurs. In another non-limiting example, the error report can also include being received by a debugging system for purposes of error recreation. In a non-limiting example, the trigger event and the error reporter 18 viewing the access log 38 are registered with the system 100 during a runtime.

For example, FIG. 2 illustrates the error 16 occurring in the functional element 46f. In response to receiving and error 16, the FMS 14 can raise a framework fault, which stops nominal operation of the system 100. The framework fault can activate the fault handler 48. The fault handler 48 can identify the error 16 and defined the error functional element 46f as the functional element 46f since the error occurred in the functional element 46f. The fault handler 48 electrically communicates the error functional element as functional element 46f to the error reporter 18. The error reporter 18 can retrieve the list of the set of data elements accessed by the functional element 46f from the access log 38. The error reporter 18 can also retrieve the present set of data elements values corresponding to the list of the set of data elements, which the functional element 46f accesses.

As illustrated by the dotted lines with arrows, the error reporter 18 retrieves the presumed data element values and the present data element values, during the time of the error 16, of the functional element 46f, the function element 46c, the top-level functional element interface 44, the sub-component 42, and the framework component 40. The error reporter 18 can create the error report based on the error functional element 46f and include the presumed data element values and the present data element of the functional element 46f, the function element 46c, the top-level functional element interface 44, the sub-component 42, and the framework component 40. The error reporter 18 can also export the error report to the display 50 for review and analysis by a user of the system 100.

Upon generation of the error report by the error reporter 18, the system 100 or FMS 14 can reset or restart operations, functional elements 46, or the like, and continue operation in a non-error state.

Figure 3:
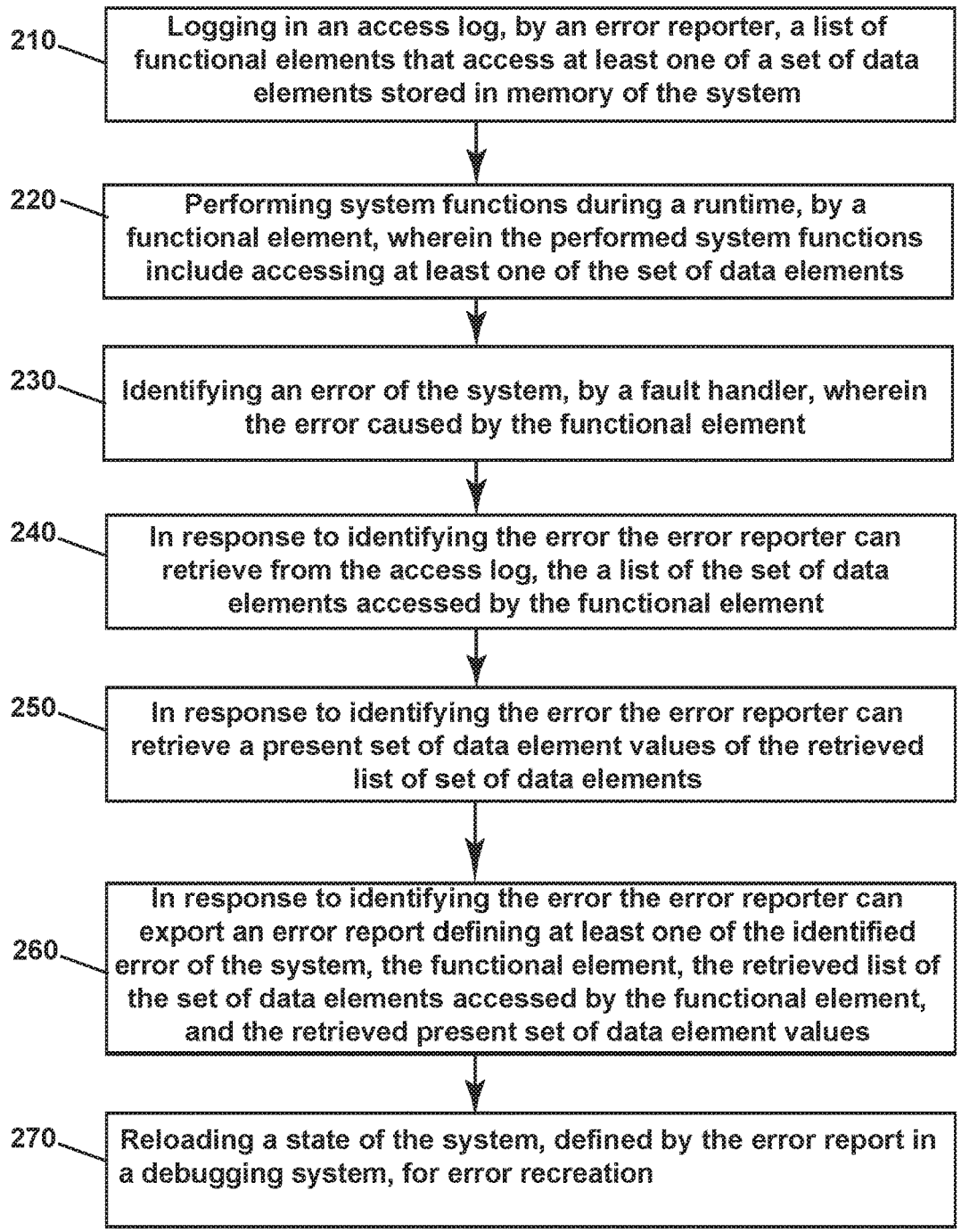
FIG. 3 depicts a flow diagram of an example method of the intermittent issue within a FMS.

FIG. 3 depicts a flow diagram of an example method 200 according to example aspects of the present disclosure. FIG. 3 depicts steps performed in a particular order for purposes of illustration and discussion. Those of ordinary skill in the art, using the disclosure provided herein, will understand that the method discussed herein can be adapted, rearranged, expanded, omitted, performed simultaneously, or modified in various ways without deviating from the scope of the present disclosure. The method 200 can be performed using the system 100 described herein.

The method 200 can include reporting an error 16, such as an intermittent error 16 within the system 100 or FMS 12. At 210 the method 200 can include logging, in an access log 38, a list of functional elements 46 that access at least one of a set of data elements sorted in memory of the system 100. In a non-limiting example logging in the access log 38 can also include logging a set of triggering events defining at least one of a user interface interaction event stored in the UI log 34 and a system event stored in the event log 36. At 220, the functional element 46 can include performing a set of system functions during runtime, wherein the performed system functions include accessing at least one of the set of data elements. At 230, the method 200 can include identifying an error of the system, wherein the error may be caused by the functional element 46. In one non-limiting example, the fault handler 48 or the error reporter 18 can identify the error of the system. In a non-limiting example, the identifying the error 16 of the system 100 can occur during a system runtime prior to restarting the system 100.

At 240, in response to identifying the error 16, the error reporter 18 can retrieve a list of the set of data elements accessed by the functional element 46 from the access log 38. In a non-limiting example, the error reporter 18 can also retrieve a recent list of a subset of data elements recently accessed by the functional element 46. At 250, in response to identifying the error 16, the error reporter 18 can also include retrieving a present set of data elements values of the list of the set of data elements previously retrieved by the error reporter 18. At 260, in response to identifying the error 16, the error reporter 18 can export an error report defining at least one of the error 16, the error functional element, the list of the set of data elements access by the error functional element, and the present set of data element values correlating to the list of the set of data elements accessed by the error functional element. In a non-limiting example, wherein exporting the error report, further includes the error report, defining the set of trigger events.

At 270, the system 100 can also reload a state of the system 100 into a debugging system (not shown) for error recreation, wherein the state can be defined by the error report. The error report can define the state by including the error-causing component and the data values of the set of data elements the error-causing component accesses. The error report can also define the state by including the state of the system 100 prior to the error 16 occurrence or after the error 16 occurrence. A benefit of the debugging system being capable of recreating the state defined by the error report can include being able to analyze and resolve intermitted or "once" errors rapidly. Conventional debugging systems can be difficult to recreate the intermitted or "once" errors reliably. In another non-limiting example, the error reporter 18 can enable an execution of the functional elements 46 in response to the state of the system reloaded into the debugging system.

Figure 4:
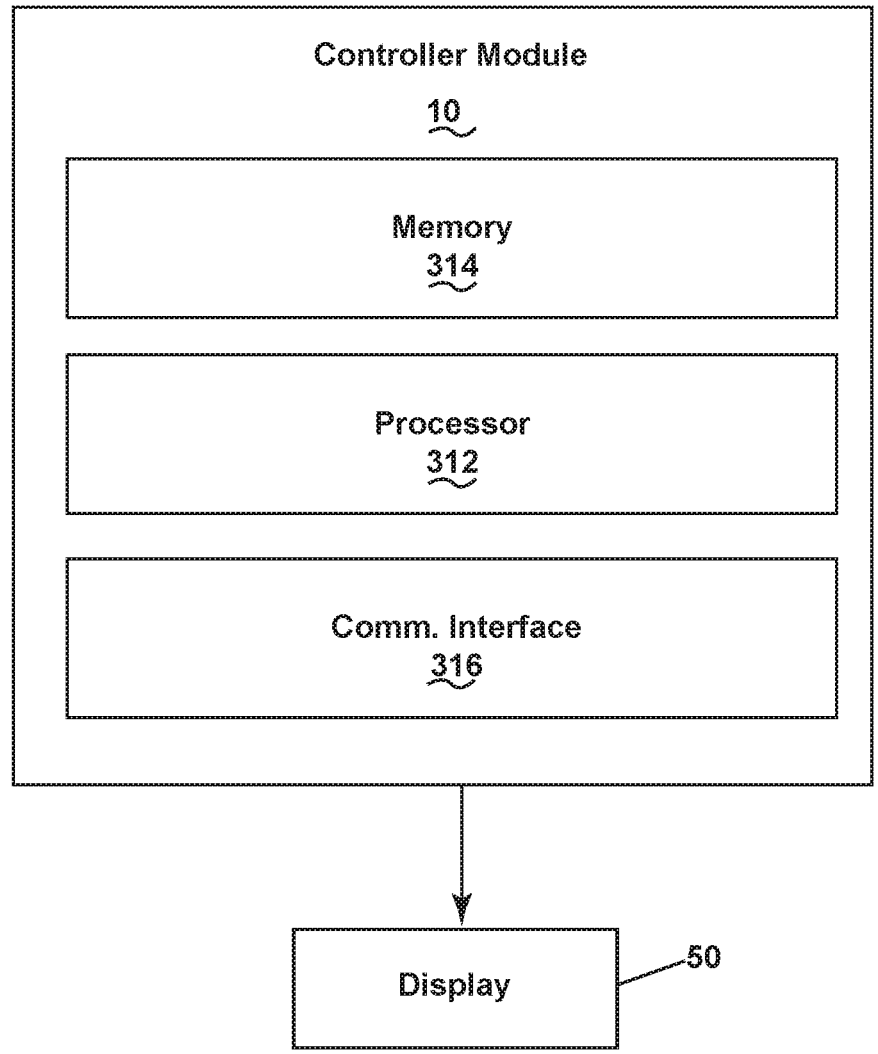
FIG. 4 illustrates a schematic view of a controller module usable in accordance with various aspects described herein.

FIG. 4 illustrates a diagram of a controller module 10 that can be utilized in the system 100, the FMS 14, the error reporting system 13, or a combination thereof. In general, the controller module 10 may correspond to any suitable processor-based device, including one or more computing devices. The controller module 10 can include one or more processors(s) 412 and one or more memory devices(s) 414. The one or more processors(s) 412 can include any suitable processing device, such as a microprocessor, micro-control device, integrated circuit, logic device, or the like. The one or more memory devices(s) 414 can include one or more computer-readable media, including, but not limited to, non-transitory computer-readable media, RAM, ROM, hard drives, flash drives, or the like.

The one or more memory device(s) 314 can store information accessible by the one or more processor(s) 312, including computer-readable instructions that can be executed by the one or more processors(s) 312. The instructions can be any set of instructions that when executed by the one or more processors(s) 312, cause the one or more processors(s) 312 to perform operations. In some aspects, the instructions can be executed by the one or more processor(s) 312, to cause the one or more processors(s) 312 to perform operations. In some aspects, the instructions can be executed by the one or more processor(s) 312 to cause the one or more processor(s) to perform operations, such as any of the operations and functions for which the controller module 10 is configured. For instance, the operations can be used for performing method 200, as described herein, or any other operations or functions of the one or more control system. The instructions can be software written in any suitable programming language or can be implemented in hardware. Additionally, or alternatively, the instructions can be executed in logically or virtually separate threads on processor(s) 412. The memory device(s) 314 can further store data that can be accessed by the processor(s) 312.

The controller module 10 can also include a communication interface 316. The communication interface 316 can include suitable components for interfacing with one or more network(s), devices, or the like, including for example, transmitters, receivers, ports, control devices, antennas, displays, or other suitable components. For example, the communication interface 316 can be configured to communicate with the system via the controller module 10.

In this way, example aspects of the present disclosure can provide a number of technical effects and benefits. For instance, the ability to identify an exact state of a modular component within an FMS or the state of the FMS as an error occurs enables the ability to duplicate the error using external tools such as a debugging system. Additionally, aspects of the disclosure are included wherein only a relevant subset of data (e.g. that data accessed by the error functional element) is reported, compared with attempting to record all data without context of the data at the time of error. Thus, aspects of the disclosure can include identifying the set of inputs prior to the fault, and can provide the ability to "replay" a single execution to recreate the error of the component, using the original inputs, up to and including the triggering of the fault or error.

While conventional error reporting systems can include error information, the error information is usually mass a dumping of information not specific to the error and requires large amounts of storage space. Thus, aspects of the disclosure can incorporate on-the-fly selection of relevant information or a subset of the set of data elements accessed by the error functional element, thus enabling or allowing for use of aspects of the disclosure in systems or FMS components where it is not feasible (e.g. resources are constrained) to store or report all data in the event of an error. Furthermore, compared with conventional systems, the amount of time to "recover" from a crashed system can be reduced by aspects of the disclosure, as reporting only a subset of the set of data elements by way of the error report, can be less than an amount of time to report all data, or can reduce data storage requirements. In the example of an avionics system, such as an FMS, recovery time of a crashed system is important, especially when the system is in-situ operation (e.g. on a flying aircraft).

Another benefit can include the ability to identify an exact state of a modular component within an FMS or the state of the FMS just prior to the error occurring or just after the error occurrence. Conventional systems fail to identify the state of the system just prior to the fault or after the fault. Also the error information in conventional systems usually consists of a recorded state of the working memory of a FMS only at a specific time, generally when the FMS or system has terminated abnormally or unexpectedly.

Another technical effect and benefit of the disclosure can include decreasing the time, the cost, or the maintenance of debugging the intermittent or "only once" issues, which can result in an improved final product due to fewer internal errors. The debugging can be minimized by including on-the fly error identification or on-the-fly error capture, which can be very beneficial for embedded systems where storage resources are constrained.

Another benefit of the disclosure can include faster customer response to problems reported in the field because the disclosure enables a reduced foot-print of save data. Other conventional systems can use a core dumping process, which can be time consuming The disclosure saves data that pertains to the specific error rather than saving data of the whole system, which results in less time searching for the error information.

Many other possible configurations in addition to those shown in the above figures are contemplated by the present disclosure. To the extent not already described, the different features and structures of the various aspects can be used in combination with others as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

Further aspects of the invention are provided by the subject matter of the following clauses:

A system for an error reporting system, comprising, a system having memory defining a set of data elements storing a respective set of data element values, and a set of functional elements, an access log defining a list of functional elements that access at least a subset of the set of data elements, an error reporter having view access to the set of data elements of the system, and in response to receiving a trigger event that one of the set of functional elements access at least the subset of the data elements, logging an access entry in the access log, including at least the one of the set of functional elements access at least the subset of the data elements and the subset of the data elements accessed by the one of the set of functional elements, and a fault handler configured to identify an error of the system, including identifying at least one of the set of functional elements that cause the identified error, defining an error functional element, the fault handler in communication with the error reporter, wherein, in response to identifying the error of the system, the fault handler is further configured to provide the error functional element to the error reporter, and wherein the error reporter is configured to identify a plurality of access entries in the access log based on the error functional element, retrieve a present subset of the set of data element values of the subset of data elements accessed by the error functional element, and to export an error report defining at least the error functional element, the identified access entries, and the present subset of data element values.

The system of any preceding clause wherein the system is a flight management system.

The system of any preceding clause wherein the error reporter is further configured to export the error report to a file for later analysis.

The system of any preceding clause wherein the error reporter is further configured to export the error report to a display.

The system of any preceding clause wherein the access log is stored in the memory of the system.

The system of any preceding clause wherein the error reporter view access and the trigger event are registered with the system during a runtime.

The system of any preceding clause wherein the system further includes an event log, and wherein at least a portion of the event log is included in the error report.

The system of any preceding clause further comprising a user interface for the system, and wherein the system further includes a user interface log defining a user input received at the user interface, and wherein at least a portion of the user interface log is included in the error report.

The system of any preceding clause wherein the portion of the user interface log included in the error report includes the user input related to at least one of the error functional element and the subset of the set of data elements accessed by the error functional element.

The system of any preceding clause further comprises a debugging system configured to receive the error report of the error reporting system.

The system of any preceding clause wherein the error reporter is further configured to identify a recent subset of the plurality of access entries in the access log based on the error functional element, and retrieve the present subset of the set of data element values of the subset of data elements recently accessed by the error functional element.

A method for reporting an intermittent error within a system, the method comprising, logging in an access log, a list of functional elements that access at least one of a set of data elements stored in memory of the system, performing system functions during runtime, by a functional element, wherein the performed system functions include accessing at least one of the set of data elements, identifying an error of the system, the error caused by the functional element, and in response to identifying the error, retrieving, by the error reporter, from the access log, a list of the set of data elements accessed by the functional element, retrieving, by the error reporter, a present set of data element values of the list of set of data elements, exporting, by the error reporter, an error report defining at least one of the error, the functional element, the list of the set of data elements, and the present set of data element values.

The method of any preceding clause further comprising logging in the access log, a set of triggering events defining at least one of a user interface interaction event and a system event.

The method of any preceding clause wherein exporting the error report further includes the error report defining the set of triggering events.

The method of any preceding clause wherein retrieving from the access log further comprises retrieving a recent list of a subset of data elements recently access by the functional element.

The method of any preceding clause further comprising reloading a state of the system, defined by the error report in a debugging system, for error recreation.

The method of any preceding clause wherein reloading the state of the system includes reloading the retrieved present set of data element values into a respective set of data elements of the debugging system.

The method of any preceding clause wherein reloading the state of the system include enabling an execution of the functional element.

The method of any preceding clause wherein the identifying the error of the system occurs during a system runtime prior to restarting the system.

This written description uses examples for the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An error reporting system, comprising:
   a system having memory defining a set of data elements storing a respective set of current data element values, and a set of functional elements accessing at least a subset of current data element values and utilizing the accessed subset of current data element values;
   an access log defining a list of functional elements that access the at least a subset of the set of data element values;
   an error reporter having view access to the set of current data element values of the system memory, and in response to receiving a trigger event that one of the set of functional elements access at least the subset of the current data element values, logging an access entry in the access log, including at least the one of the set of functional elements access of the at least the subset of the current data element values and the subset of the data elements accessed by the one of the set of functional elements; and
   a fault handler configured to identify an error of the system, including identifying at least one of the set of functional elements causing the identified error, defining an error functional element, the fault handler in communication with the error reporter;
   wherein, in response to identifying the error of the system, the fault handler is further configured to provide the error functional element to the error reporter, and wherein the error reporter is configured to identify a plurality of access entries in the access log based on the error functional element, retrieve a subset of the set of current data element values of the system memory accessed by the error functional element, and to export an error report defining at least the error functional element, the identified access entries, and the subset of current data element values.

2. The error reporting system of claim 1 wherein the system is a flight management system.

3. The error reporting system of claim 1 wherein the error reporter is further configured to export the error report to a file for later analysis.

4. The error reporting system of claim 1 wherein the error reporter is further configured to export the error report to a display.

5. The error reporting system of claim 1 wherein the access log is stored in the memory of the system.

6. The error reporting system of claim 1 wherein the error reporter view access and the trigger event are registered with the system during a runtime.

7. The error reporting system of claim 1, wherein the system further includes an event log, and wherein at least a portion of the event log is included in the error report.

8. The error reporting system of claim 1 wherein the error reporter is further configured to identify a recent subset of the plurality of access entries in the access log based on the error functional element, and retrieve the subset of the set of current data element values of the subset of data elements recently accessed by the error functional element.

9. The error reporting system of claim 1, wherein at least a subset of the current data element values define temporally-limited data element values.

10. The error reporting system of claim 9, wherein the fault handler is further configured to retrieve a subset of the temporally-limited data element values of the system memory at the time of the error of the system.

11. The error reporting system of claim 1, wherein the set of data elements are a set of data topics for a flight management system.

12. A method for reporting an intermittent error within a system, the method comprising:
- logging in an access log, a list of functional elements that access at least one of a set of temporary data elements stored in memory of the system, wherein each of the list of functional elements utilizes the at least one of a set of temporary data elements stored in memory of the system;
- performing system functions during runtime, by a functional element, wherein the performed system functions include accessing at least one of the set of temporary data elements; and
- identifying an error of the system, the error caused by the functional element, and in response to identifying the error:
  - retrieving, by the error reporter, from the access log, a list of the set of temporary data elements accessed by the functional element;
  - retrieving, by the error reporter, a current set of data element values stored in the set of temporary data elements of the list of set of temporary data elements; and
  - exporting, by the error reporter, an error report defining the error, the functional element, the list of the set of temporary data elements, and the current set of data element values.

13. The method of claim 12, further comprising logging in the access log, a set of triggering events defining at least one of a user interface interaction event and a system event.

14. The method of claim 13 wherein exporting the error report further includes the error report defining the set of triggering events.

15. The method of claim 12 wherein retrieving from the access log further comprises retrieving a recent list of a subset of temporary data elements recently access by the functional element.

16. The method of claim 12, further comprising reloading a state of the system, defined by the error report in a debugging system, for error recreation.

17. The method of claim 16 wherein reloading the state of the system includes reloading the retrieved current set of data element values into a respective set of temporary data elements of the debugging system.

18. The method of claim 17, wherein reloading the state of the system include enabling an execution of the functional element.

19. The method of claim 16, wherein reloading the state of the system include enabling an execution of the functional element.

20. The method of claim 12 wherein the identifying the error of the system occurs during a system runtime prior to restarting the system.

* * * * *

UNITED STATES PATENT AND TRADEMARK OFFICE
CERTIFICATE OF CORRECTION

| | |
|---|---|
| PATENT NO. | : 11,995,922 B2 |
| APPLICATION NO. | : 16/943619 |
| DATED | : May 28, 2024 |
| INVENTOR(S) | : Brace et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 452 days.

Signed and Sealed this
Thirty-first Day of December, 2024

Derrick Brent
*Acting Director of the United States Patent and Trademark Office*